US012587409B2

(12) United States Patent
Tarkoff et al.

(10) Patent No.: US 12,587,409 B2
(45) Date of Patent: Mar. 24, 2026

(54) A²B CABLE LENGTH DETECTION

(71) Applicant: Analog Devices, Inc., Wilmington, MA (US)

(72) Inventors: Joseph David Tarkoff, Somerville, MA (US); Praveen Philip, Millis, MA (US); Md Kamruzzaman Shuvo, Norwood, MA (US)

(73) Assignee: Analog Devices, Inc., Wilmington, MA (US)

( * ) Notice: Subject to any disclaimer, the term of this patent is extended or adjusted under 35 U.S.C. 154(b) by 350 days.

(21) Appl. No.: 18/139,793

(22) Filed: Apr. 26, 2023

(65) Prior Publication Data

US 2023/0403179 A1     Dec. 14, 2023

Related U.S. Application Data

(60) Provisional application No. 63/350,323, filed on Jun. 8, 2022.

(51) Int. Cl.
| | |
|---|---|
| *H04L 12/40* | (2006.01) |
| *H04L 5/16* | (2006.01) |
| *H04L 41/12* | (2022.01) |
| *H04L 43/0852* | (2022.01) |

(52) U.S. Cl.
CPC .......... *H04L 12/40169* (2013.01); *H04L 5/16* (2013.01); *H04L 41/12* (2013.01); *H04L 43/0852* (2013.01)

(58) Field of Classification Search
CPC ..... H04L 12/40169; H04L 5/16; H04L 41/12; H04L 43/0852
USPC ......................................................... 370/252
See application file for complete search history.

(56) References Cited

U.S. PATENT DOCUMENTS

| | | | |
|---|---|---|---|
| 2002/0110155 A1* | 8/2002 | Pearce ................. | H04L 12/423 |
| | | | 370/254 |
| 2007/0018708 A1* | 1/2007 | Yoo ....................... | H04L 47/263 |
| | | | 327/261 |
| 2009/0046586 A1* | 2/2009 | Stuart ................... | H04J 3/0682 |
| | | | 370/236 |
| 2018/0046171 A1* | 2/2018 | Sapir ........................ | H02P 5/00 |
| 2018/0091245 A1* | 3/2018 | Leyrer ................. | H04J 3/0655 |

* cited by examiner

*Primary Examiner* — Nicholas R Taylor
*Assistant Examiner* — Chong G Kim
(74) *Attorney, Agent, or Firm* — Schwegman Lundberg & Woessner, P.A.

(57) ABSTRACT

A method of automatically detecting delay due to cable length between network nodes coupled to a two-wire communication bus of a network. The method includes establishing, by a first node of the network, a first specified delay value of a variable delay setting; discovering a next node on the communication bus using a variable delay setting including the delay setting established at the first specified delay value; after discovering the next node, changing the variable delay setting until the next node drops off the communication bus at a second specified delay value of the variable delay setting; and setting a communication delay setting between the first node and the next node using the first and second specified delay values.

20 Claims, 3 Drawing Sheets

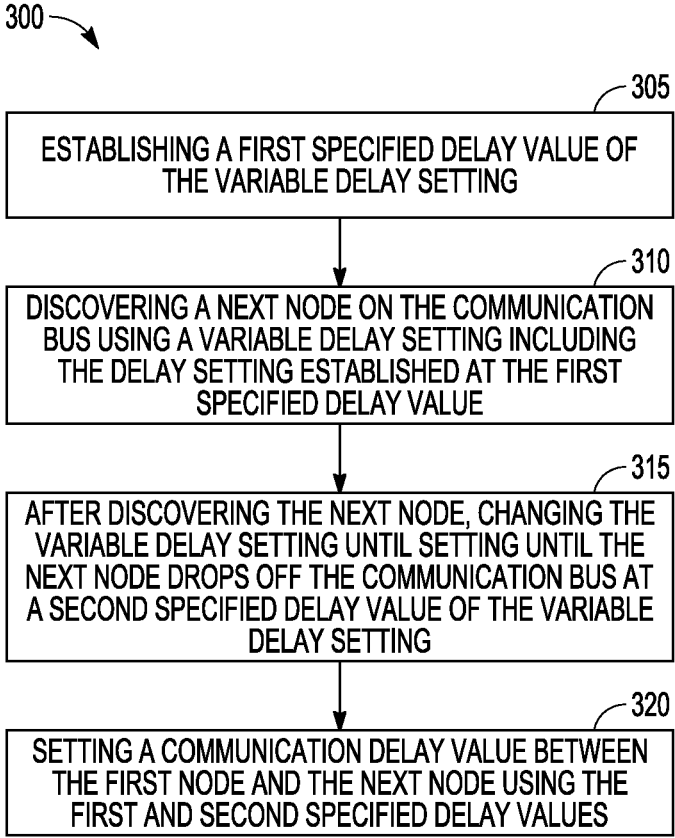

300 ⌐

305

ESTABLISHING A FIRST SPECIFIED DELAY VALUE OF
THE VARIABLE DELAY SETTING

310

DISCOVERING A NEXT NODE ON THE COMMUNICATION
BUS USING A VARIABLE DELAY SETTING INCLUDING
THE DELAY SETTING ESTABLISHED AT THE FIRST
SPECIFIED DELAY VALUE

315

AFTER DISCOVERING THE NEXT NODE, CHANGING THE
VARIABLE DELAY SETTING UNTIL SETTING UNTIL THE
NEXT NODE DROPS OFF THE COMMUNICATION BUS AT
A SECOND SPECIFIED DELAY VALUE OF THE VARIABLE
DELAY SETTING

320

SETTING A COMMUNICATION DELAY VALUE BETWEEN
THE FIRST NODE AND THE NEXT NODE USING THE
FIRST AND SECOND SPECIFIED DELAY VALUES

FIG. 3

A²B CABLE LENGTH DETECTION

CLAIM OF PRIORITY

This application claims priority to U.S. Provisional Application Ser. No. 63/350,323, filed Jun. 8, 2022, which is incorporated by reference herein in its entirety.

TECHNICAL FIELD

The present disclosure relates generally to communication systems and, more particularly, to two-wire communication systems and applications, including determining a cable length of a microphone, speaker, or other device using the two-wire communication system.

BACKGROUND

Automotive Audio Bus (A²B) is a high bandwidth, bidirectional, digital audio bus for communication of audio information among the network nodes connected to the A²B. A²B is capable of transporting Inter Integrated Circuit Sound (I²S) information, Time-Division Multiplexing (TDM) information, Pulse Density Modulation (PDM) information, and Inter Integrated Circuit (I²C) control information, along with clock and power, using a single two-wire Unshielded Twisted Pair (UTP) cable over distances up to 30 meters (30 m) between nodes and 300 m over the entire daisy chain. A²B can be used as its own network with embedded sub-networks, or as an endpoint transport bus used in combination with other, longer distance protocols. The clock is synchronous on all nodes in a single A²B network. Microphone and serial audio data is received on each node in the system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a flow diagram of an example of automatically detecting delay due to the cable length between network nodes.

DETAILED DESCRIPTION

Figure 1:
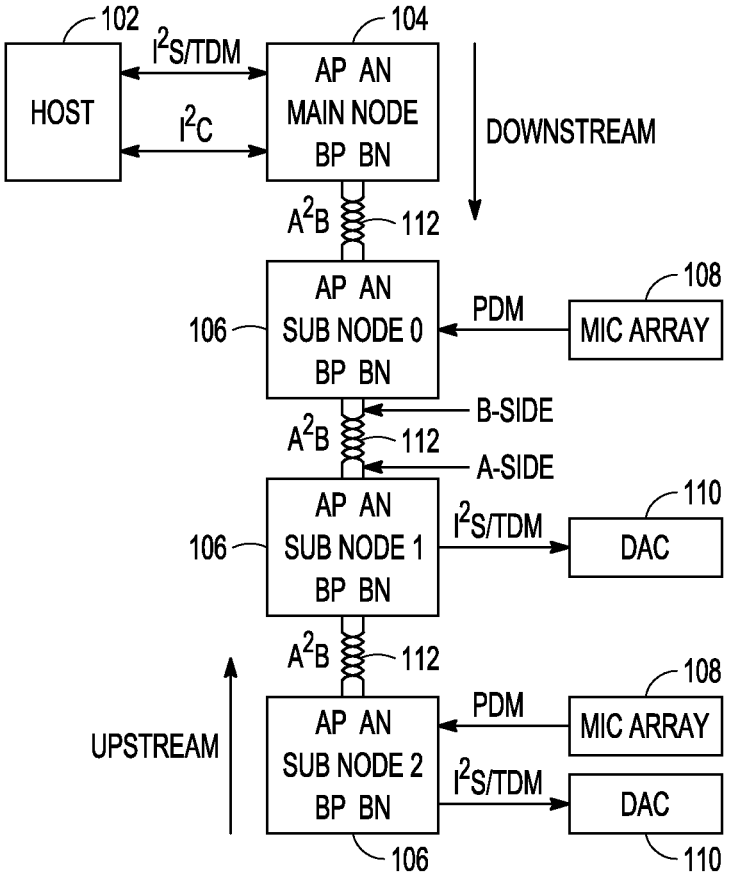
FIG. 1 is a block diagram of an example of a communication network.

FIG. 1 is a block diagram of an example of a communication network 100. The network includes multiple network nodes including a main node 104 and multiple sub-nodes 106. A host processor 102 is included with (or connected to) the main node 104. The host processor 102 communicates one or more of I²S, TDM information, Serial Peripheral Interface (SPI) information, and I²C control information with the main node 104. The sub-nodes 106 communicate one or more of I²S, TDM information, and PDM information with end devices such as a microphone array 108 and a digital-to-analog converter (DAC) 110, and transceivers of the sub-nodes 106 communicate data to the main node 104. The main node 104 and sub-nodes 106 are connected by an A²B. When the network comes online, the host processor 102 may begin discovery to connect and configure the sub-nodes 106 of the network.

A²B is a bidirectional half-duplex bus. The main node 104 and sub-nodes 106 are connected in series by A²B links 112. An A²B link 112 between network nodes includes an A-side (or upstream) connection and a B-side (or downstream) connection of the A²B link. Discovery of the bus happens in the downstream direction, but in order to get any data from a sub-node being discovered the bus has to turn around and transmit back upstream to the main node. This can involve precise timing such that the downstream node can shut off its receiver, enable its transmitter, and begin sending to the upstream node, which shuts off its transmitter and enables its receiver. The timing of this operation is dependent on the length of the cable (e.g., UTP) connecting the discovering node and the discovered node. In an illustrative example, support can be provided for cable lengths up to 30 m between nodes which translates to approximately 150 ns of delay in communication between nodes. Using the wrong delay setting results in bus contention and the inability to discover more nodes in the system.

One challenge with A²B is a need for apriori knowledge of each cable's length in a system. The cable length can be characterized as a delay in the system. The present cable length detection scheme described herein allows any supported cable length to be detected and used to establish stable system timing. The present cable length detection scheme attempts different delay settings until it successfully discovers the downstream node. Once the downstream node has been discovered the delay setting is further decremented until the downstream node drops off the bus. This characterization of delay settings allows the optimal delay to be recorded and the downstream node to be rediscovered with optimal timing to maximize system stability and bandwidth.

Figure 2:
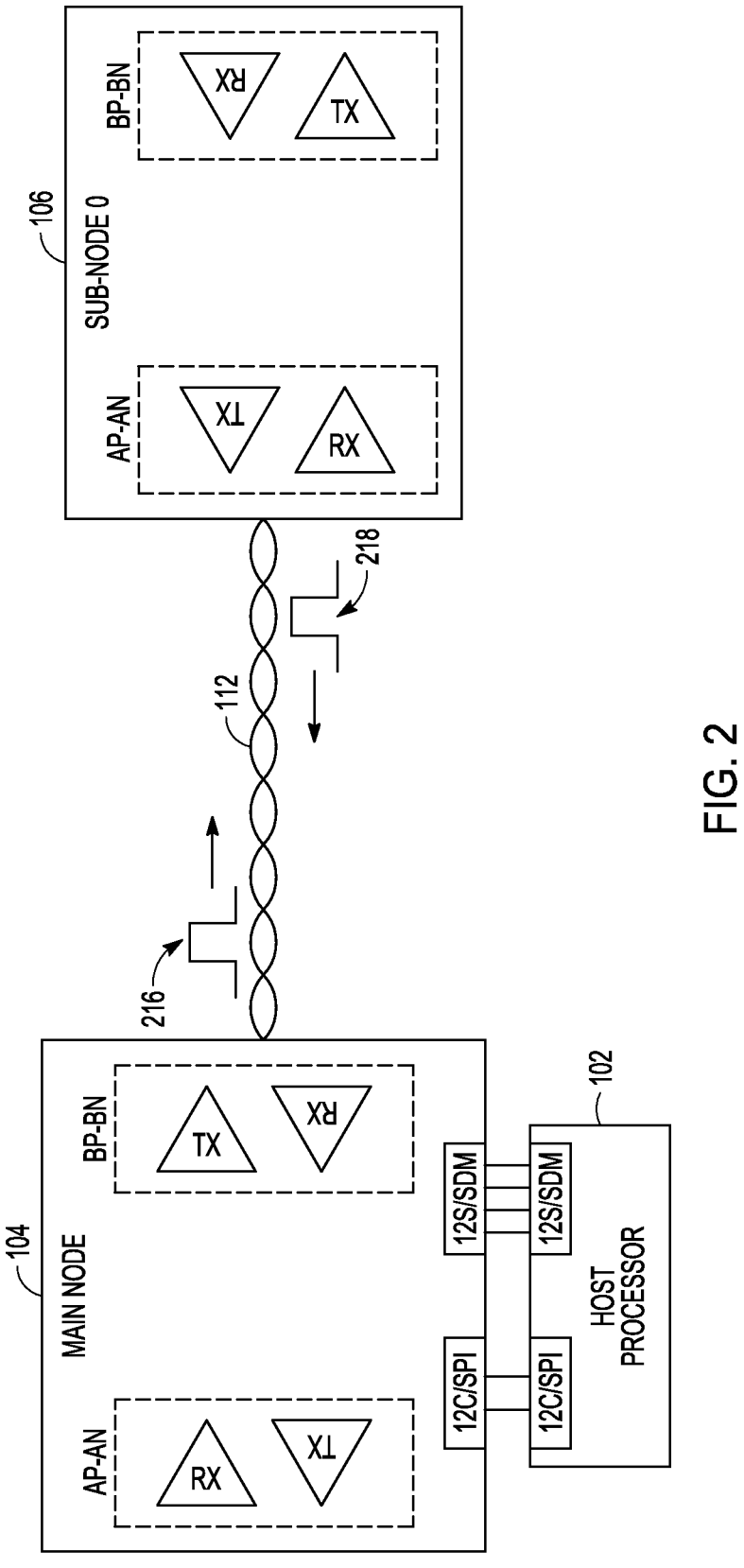
FIG. 2 is a block diagram of an example of a main node and a sub-node connected by an A²B link.

FIG. 2 is a block diagram of an example of a main node 104 and a sub-node 106 connected by an A²B link 112. Each of the nodes includes an A-side bus interface transceiver to a two-wire communications bus and a B-side bus interface transceiver. The main node 104 includes a host processor 102. The host processor 102 can include memory (not shown). The memory includes instructions in one or more of firmware and software that configures the host processor 102 to perform the functions described. The transceivers of the nodes include a transmitter (TX) and a receiver (RX). The communications bus can be an A²B and the B-side bus interface of the main node 104 is connected to the A-side bus interface of the sub-node 106.

FIG. 3 is a flow diagram of an example of automatically detecting delay due to the cable length between network nodes coupled to a two-wire communication bus of a network. The method may be performed using the network nodes and communication bus of the examples of FIGS. 1 and 2.

At block 305, the host processor 102 of the main node 104 of the network (e.g., the host processor 102 in FIG. 2) sets, specifies, or otherwise establishes a delay value of a variable delay setting between sub-nodes. The variable delay setting may be a delay timed by the host processor 102. The host processor 102 may initiate a detection window at the end of the delay for the main node 104 to listen for a downstream node (e.g., sub-node 1 that is downstream from sub-node 0 in FIG. 1).

In some examples, the main node 104 transmits a discovery packet 216 over the A²B link 112 to the sub-node 0 using the B-side of the main transceiver. In certain examples, the main node 104 may check for a DC level on the A²B bus link

3

112 before initiating the discovery process. The DC level may indicate the integrity of the link (e.g., whether there is a short in the link). Sub-node 0 passes the discovery packet on to sub-node 1. The main node 104 disables its B-side transmitter and enables its B-side receiver. After the specified delay, the main node 104 listens for a response from sub-node 1 that sends its response through sub-node 0. If a response is detected, at block 310 sub-node 1 is discovered by the main node 104 using the specified delay value. The main node 104 may record the specified delay value between sub-node 0 and sub-node 1 by storing the delay time in memory.

If no response from sub-node 1 is detected, the main node 104 recurrently retransmits the discovery packet and increases the value of the variable delay setting used in listening for the response from sub-node 1 until the response is detected. The delay value that was used when discovering the sub-node 1 may be recorded. In some examples, if no response is found after a predetermined number of attempts or after the delay is set to a maximum value, the host processor 102 may end trying to discover the downstream node on the network. This may happen when the cable connected between network nodes is too long or there is a problem with the connection to the transceiver of the main node 104.

When the downstream sub-node is discovered, the main node 104 may then determine an optimal delay setting for communicating with the downstream sub-node. At block 315, the host processor 102 may change the variable delay setting (e.g., decrease the value of the variable delay setting) until the downstream sub-node drops off the communication bus at a second specified delay value of the variable delay setting.

At block 320, the communication delay value to be used for communicating with the sub-node 106 is determined and may be recorded. The host processor 102 may set an optimal delay using the first delay value determined by the first response from the sub-node 106 and the second delay value determined when communication with the sub-node 106 dropped off. For example, the optimal delay may be set between the first and second delay values or as an offset from one of the delay values.

The discovery process may then proceed to discover the next downstream sub-node (e.g., sub-node 2 in FIG. 1). The communication delays determined for links between network nodes may be communicated upstream to the main node 104 from the sub-nodes as part of the discovery process. The communication delays may be characterized as cable lengths by the host processor 102. For example, a delay of 150 nanoseconds (150 ns) may be characterized as a cable length of 30 meters (30 m) and the cable lengths may be stored in one or more network nodes.

Below is an example of pseudocode that can be encoded into instructions to be performed by the host processor 102 of a main node 104 for cable detection of an $A^2B$ link 112. When the discovery is successful, the structure of the link between the nodes is committed and can be recorded.

The host processor 102 may determine other network parameters (e.g., total audio channels, bit widths, etc.) and combine these parameters with the determined cable delays to produce optimal response cycles settings. The host processor 102 may check to make sure the response cycles, bandwidth, and power settings are valid. The host processor 102 may reprogram network with optimal response cycle settings.

Pseudocode Example

Set MRESPCYCS=0x7F
Discover SUB0 using MRESPCYCS value

4

FOR(i=1,i<16,i++) //i is sub node number
//Set initial discovery for 0 m to 5 m cable, j is (bit times)/4
FOR (j=4, j<10,j++) {
IF (NOT DISCOVERED YET)
Discover SUBi using $S_{(i-1)}$RESPCYCS-j
IF (DISCOVERY fails)
    IF (j=8) //If 5 settings fail there's no sub in place
        BREAK INNER and OUTER Loop
    ELSE
CONTINUE inner loop //Keep trying to discover
    ELSE //(DISCOVERY SUCCEEDED)
//Once discovery is achieved push the timing to failure
Change SUBiRESPCYCS to $SUB_{(i-1)}$RESPCYCs-j-1
Commit the new structure
IF (SUBi drops connection)
    $SUB_i$RESPCYCS=$SUB_{(i-1)}$RESPCYCS-j+1
    REDISCOVER with new $SUB_i$RESPCYCS
    BREAK inner loop
    IF(j=9)
        ERROR MESSAGE—"Cable is too long"
}
}
Below is an example of using the pseudocode above, where two network nodes are connected by 15 m of cable (e.g., 15 m of UTP).

Pseudocode Example: (2 Sub nodes, 15 m Cable)

Discover SUB0 using MRESPCYCS (0x7F) value
Discover SUB1 using SORESPCYCS-4 (0x7B) value
Change SUB1RESPCYCS to SUB0RESPCYCS-5
Commit the new structure
Change SUB1RESPCYCS to SUB0RESPCYCS-6
Commit the new structure
Change SUB1RESPCYCS to SUB0RESPCYCS-7
Commit the new structure
Change SUB1RESPCYCS to SUB0RESPCYCS-8
Commit the new structure
(fails)
SUB1RESPCYCS=SUB0RESPCYCS-8+2=SUBORE-SPCYCS-6=0x79
REDISCOVER with new SUB1RESPCYCS=0x79
BREAK inner Loop
Discover SUB2 using S1RESPCYCS-4
. . .

The process can continue to characterize the link to the next downstream node.

The cable length detection techniques described herein allows any supported cable length between network nodes to be detected and used to establish stable system timing. The characterization of the cable lengths as delay settings allows the optimal communication delays between nodes to be recorded and the network nodes to be rediscovered with optimal timing to maximize system stability and bandwidth.

ADDITIONAL DESCRIPTION AND EXAMPLES

Example 1 includes subject matter (such as method of automatically detecting delay due to cable length between network nodes coupled to a two-wire communication bus of a network) comprising establishing, by a first node of the network, a first specified delay value of a variable delay setting; discovering a next node on the communication bus using a variable delay setting including the delay setting established at the first specified delay value; after discovering the next node, changing the variable delay setting until the next node drops off the communication bus at a second specified delay value of the variable delay setting; and setting a communication delay value between the first node and the next node using the first and second specified delay values.

In Example 2, the subject matter of Example 1 optionally includes transmitting, by the first node, a discovery packet to discover the next node; recurrently increasing the variable delay setting when no response to the discovery packet is received until a response is detected; sending a second packet to the next node and listening for a response to the second packet; and decreasing the variable delay setting from the discover delay value until no response is detected at the second specified delay value.

In Example 3, the subject matter of one or both of Examples 1 and 2 optionally includes transmitting, by a transmitter of the first node, a discovery packet to discover the next node; and disabling the transmitter of the first node and enabling a receiver of the first node during the first specified delay time after transmitting the discovery packet.

In Example 4, the subject matter of one or any combination of Examples 1-3 optionally includes the first node being a head node, and the second node being a sub-node.

In Example 5, the subject matter of one or any combination of Examples 1-3 optionally includes the first node being a first sub-node connected to the communication bus, and the second node being a second sub-node next to the first sub-node on the communication bus.

In Example 6, the subject matter of one or any combination of Examples 1-5 optionally includes recording delay settings associated with discovered nodes.

In Example 7, the subject matter of Example 6 optionally includes characterizing the cable length using the recorded delay settings.

In Example 8, the subject matter of one or both of Examples 6 and 7 optionally includes determining an optimal delay setting corresponding to one or more of the discovered nodes.

In Example 9, the subject matter of one or any combination of Examples 1-8 optionally includes the communication bus including a bidirectional half-duplex bus.

Example 10 includes subject matter (such as a network node device) or can optionally by combined with one or any combination of Examples 1-9 to include such subject matter, comprising a transceiver and a host processor coupled to the transceiver. The transceiver is configured to transmit and receive signals via a two-wire communication bus. The transceiver includes a transmitter and a receiver. The host processor is configured to set a variable delay setting to a first specified delay value; set a detection window according to the variable delay setting to detect a discovery response from a downstream node device; detect the discovery response from the downstream node device during a detection window set according to the first specified delay value; change the variable delay setting until a subsequent response from the downstream node is undetected at a second specified delay value of the variable delay setting; and set a communication delay value for communication with the downstream node using the first and second specified delay values.

In Example 11, the subject matter of Example 10 optionally includes a host processor is configured to send a discovery packet to discover the downstream node; recurrently increase the variable delay setting when no response to the discovery packet is received until the discovery response is detected at the first specified delay value; send a second packet to the downstream node and listening for the subsequent response to the second packet; and decrease the variable delay setting from the discover delay value until no response is detected at the second specified delay value.

In Example 12, the subject matter of one or both of Examples 10 and 11 optionally includes a host processor configured to send a discovery packet to discover the downstream node, and disable the transmitter and enable the receiver during the first specified delay time after transmitting the discovery packet.

In Example 13, the subject matter of one or any combination of Examples 10-12 optionally includes the network node device being a head node of the network, and the host processor is configured to record communication delay values associated with discovered nodes.

In Example 14, the subject matter of Example 13 optionally includes a host processor configured to characterize a cable length using one or both of the first specified delay time and the second specified delay time.

In Example 15, the subject matter of one or any combination of Examples 10-14 optionally includes the network node device configured to receive audio data from the downstream node via the transceiver.

In Example 16, the subject matter of one or any combination of Examples 10-15 optionally includes a the two-wire communication link that is an Automotive Audio Bus interface.

Example 17 includes subject matter (or can optionally be combined with one or nay combination of Examples 1-16 to include such subject matter) such as a computer-readable storage medium including instructions that when executed by a host processor of a network node device, cause the network node device to perform acts comprising establishing a first specified delay value of a variable delay setting; discovering a downstream node on the communication bus using a variable delay setting including the delay setting established at the first specified delay value; after discovering the downstream node, recurrently changing the variable delay setting until the downstream node drops off the communication bus at a second specified delay value of the variable delay setting; and setting a communication delay value for communication between the network node device and the downstream node using the first and second specified delay values.

In Example 18, the subject matter of Example 17 includes the computer-readable storage medium further including instructions that cause the network node device to perform acts including transmitting a discovery packet using a transmitter of the network node device to discover the downstream node; recurrently increasing the variable delay setting when no response to the discovery packet is received until the response is detected at the first specified delay value; sending a second packet to the downstream node and listening for a response to the second packet; and decreasing the variable delay setting from the discover delay value until no response is detected at the second specified delay value.

In Example 19, the subject matter of one or both of Examples 17 and 18 includes the computer-readable storage medium further including instructions that cause the network node device to perform acts including transmitting a discovery packet using a transmitter of the network node device to discover the downstream node; and disabling the transmitter and enabling a receiver of the network node device during the first specified delay time after transmitting the discovery packet.

In Example 20, the subject matter of one or any combination of Examples 17-19 optionally includes the computer-readable storage medium further including instructions that cause the network node device to perform acts including recording delay settings associated with discovered nodes.

These non-limiting examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of automatically detecting delay due to cable length between network nodes coupled to a two-wire communication bus of a network, the method comprising:
   establishing, by a first node of the network, a first specified delay value of a variable delay setting;
   discovering a next node on the communication bus using a variable delay setting including the delay setting established at the first specified delay value;

after discovering the next node, changing the variable delay setting to change delay from a delay value used to discover the next node until communication with the next node drops off the communication bus at a second specified delay value of the variable delay setting; and
   setting a communication delay value between the first node and the next node using the first and second specified delay values.

2. The method of claim 1, wherein discovering the next node includes:
   transmitting, by the first node, a discovery packet to discover the next node;
   recurrently increasing the variable delay setting when no response to the discovery packet is received until a response is detected;
   sending a second packet to the next node and listening for a response to the second packet; and
   decreasing the variable delay setting from the discover delay value until no response is detected at the second specified delay value.

3. The method of claim 1, wherein discovering the next node includes:
   transmitting, by a transmitter of the first node, a discovery packet to discover the next node; and
   disabling the transmitter of the first node and enabling a receiver of the first node during the first specified delay time after transmitting the discovery packet.

4. The method of claim 1, wherein the first node is a head node, and the second node is a sub-node.

5. The method of claim 1, wherein the first node is a first sub-node connected to the communication bus, and the second node is a second sub-node next to the first sub-node on the communication bus.

6. The method of claim 1, including recording delay settings associated with discovered nodes.

7. The method of claim 6, including characterizing the cable length using the recorded delay settings.

8. The method of claim 6, including determining an optimal delay setting corresponding to one or more of the discovered nodes.

9. The method of claim 1, wherein the communication bus includes a bidirectional half-duplex bus.

10. A network node device, comprising:
   a transceiver to transmit and receive signals via a two-wire communication bus, the transceiver including a transmitter and a receiver; and
   a host processor operatively coupled to the transceiver and configured to:
   set a variable delay setting to a first specified delay value;
   set a detection window according to the variable delay setting to detect a discovery response from a downstream node device;
   detect the discovery response from the downstream node device during a detection window set according to the first specified delay value;
   change the variable delay setting to change the detection window from the detection window used to detect the discovery response until a subsequent response from the downstream node is undetected at a second specified delay value of the variable delay setting; and
   set a communication delay value for communication with the downstream node using the first and second specified delay values.

11. The network node device of claim 10, wherein the host processor is configured to:
   send a discovery packet to discover the downstream node;

9 recurrently increase the variable delay setting when no response to the discovery packet is received until the discovery response is detected at the first specified delay value;

send a second packet to the downstream node and listening for the subsequent response to the second packet; and decrease the variable delay setting from the discover delay value until no response is detected at the second specified delay value.

12. The network node device of claim 10, wherein the host processor is configured to:

send a discovery packet to discover the downstream node; and disable the transmitter and enable the receiver during the first specified delay time after transmitting the discovery packet.

13. The network node device of claim 10, wherein the network node device is a head node of the network, and the host processor is configured to record communication delay values associated with discovered nodes.

14. The network node of claim 13, wherein the host processor is configured to characterize a cable length using one or both of the first specified delay time and the second specified delay time.

15. The network node device of claim 10, wherein the network node device is configured to receive audio data from the downstream node via the transceiver.

16. The network node device of claim 10, wherein the two-wire communication link is an Automotive Audio Bus interface.

17. A non-transitory computer-readable medium, including instructions that when executed by a host processor of a network node device, cause the network node device to perform acts comprising:

establishing a first specified delay value of a variable delay setting;

10 discovering a downstream node on the communication bus using a variable delay setting including the delay setting established at the first specified delay value;

after discovering the downstream node, recurrently changing the variable delay setting until communication with the downstream node drops off the communication bus at a second specified delay value of the variable delay setting; and setting a communication delay value for communication between the network node device and the downstream node using the first and second specified delay values.

18. The non-transitory computer-readable medium of claim 17, including instructions that cause the network node device to perform acts including:

transmitting a discovery packet using a transmitter of the network node device to discover the downstream node;

recurrently increasing the variable delay setting when no response to the discovery packet is received until the response is detected at the first specified delay value;

sending a second packet to the downstream node and listening for a response to the second packet; and decreasing the variable delay setting from the discover delay value until no response is detected at the second specified delay value.

19. The non-transitory computer-readable medium of claim 17, including instructions that cause the network node device to perform acts including:

transmitting a discovery packet using a transmitter of the network node device to discover the downstream node; and disabling the transmitter and enabling a receiver of the network node device during the first specified delay time after transmitting the discovery packet.

20. The non-transitory computer-readable medium of claim 17, including instructions that cause the network node device to perform acts including recording delay settings associated with discovered nodes.

* * * * *